United States Patent [19]

Schill et al.

[11] Patent Number: 4,563,801

[45] Date of Patent: Jan. 14, 1986

[54] METHOD OF REINFORCING THE EDGES OF IMPELLER VANES OR THE LIKE

[75] Inventors: Jürgen Schill, Weisenheim; Werner Rupp, Frankenthal; Werner Schaff, Frankenthal/Flomersheim; Jörg Urban, Ludwigshafen, all of Fed. Rep. of Germany

[73] Assignee: Klein, Schanzlin & Becker Aktiengesellschaft, Frankenthal, Fed. Rep. of Germany

[21] Appl. No.: 750,044

[22] Filed: Jun. 27, 1985

Related U.S. Application Data

[63] Continuation of Ser. No. 529,555, Sep. 6, 1983, abandoned.

[30] Foreign Application Priority Data

Sep. 24, 1982 [DE] Fed. Rep. of Germany ....... 3235310

[51] Int. Cl.$^4$ .......................... B21K 3/04; B23P 15/02; B23P 15/04
[52] U.S. Cl. .............................. 29/156.8 B; 29/402.07; 29/402.18; 228/193; 416/213 A; 416/224; 416/241 R
[58] Field of Search ................... 29/156.8 B, 156.8 R, 29/156.8 H, 156.8 T, 402.18, 402.04, 402.05, 402.06, 402.07, 402.11; 228/193; 416/213 A, 224, 241 R

[56] References Cited

U.S. PATENT DOCUMENTS

| | | | |
|---|---|---|---|
| 1,755,321 | 4/1930 | Hendrickson | 29/156.8 B |
| 2,615,236 | 10/1952 | Stulen et al. | 29/156.8 X |
| 3,148,954 | 9/1964 | Haas | 416/224 |
| 3,564,689 | 2/1971 | Hirtenlechner | 416/224 X |
| 3,928,901 | 12/1975 | Schilling et al. | 29/156.8 B |
| 4,241,110 | 12/1980 | Ueda et al. | 29/156.8 R X |

FOREIGN PATENT DOCUMENTS

WO80/00988 5/1980 PCT Int'l Appl. ............ 29/156.8 B

Primary Examiner—Howard N. Goldberg
Assistant Examiner—Ronald S. Wallace
Attorney, Agent, or Firm—Peter K. Kontler

[57] ABSTRACT

The inlet and/or outlet edge of a blank which is to be converted into the vane of an impeller for use in a centrifugal pump is reinforced by providing an exposed surface of the blank with a pair of contiguous recesses which extend along the edge and the deeper of which is immediately adjacent to the edge. The recesses are then filled with metallic armoring material by cladding so that some of the surplus extends beyond the recesses and/or beyond the edge. In the next step, the surplus of armoring material is removed by one or more material removing tools, together with a portion of the blank in the region of the edge so that the exposed surface is provided with a fresh edge which is defined by the armoring material.

6 Claims, 12 Drawing Figures

FIG. 1  PRIOR ART
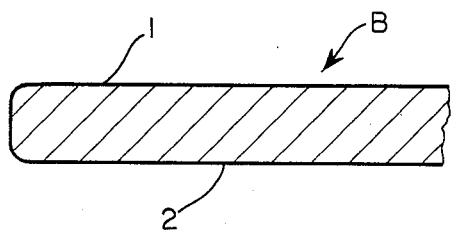
FIG. 2  PRIOR ART
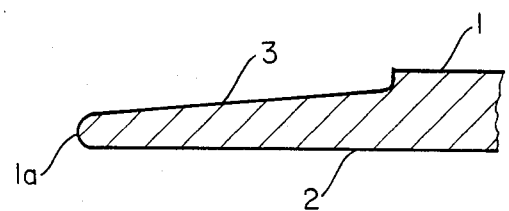
FIG. 3  PRIOR ART
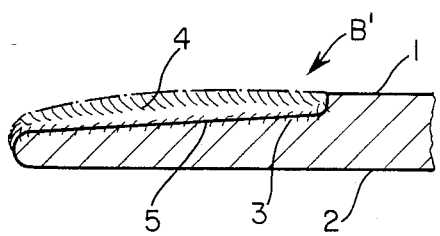
FIG. 4  PRIOR ART
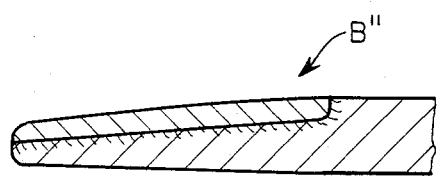
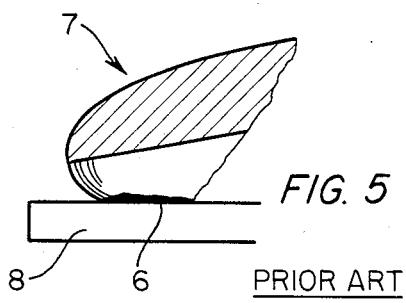
FIG. 5  PRIOR ART
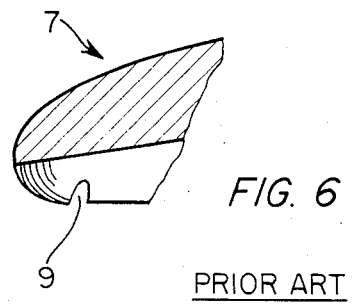
FIG. 6  PRIOR ART
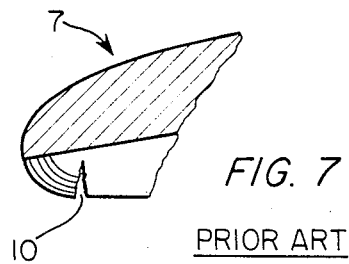
FIG. 7  PRIOR ART
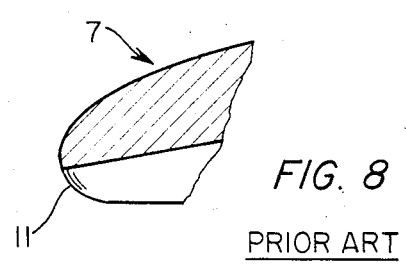
FIG. 8  PRIOR ART

METHOD OF REINFORCING THE EDGES OF IMPELLER VANES OR THE LIKE

This application is a continuation of application Ser. No. 529,555, filed Sept. 6, 1983, now abandoned.

BACKGROUND OF THE INVENTION

The present invention relates to the making and treatment of metallic workpieces, particularly to improvements in a method of preparing blanks which can be converted into the vanes of impellers, diffusers and analogous components of centrifugal pumps or like flow machines. Still more particularly, the invention relates to improvements in a method of reinforcing one or more marginal portions or edge portions of a substantially or partially flat workpiece or blank so as to render the marginal portion more resistant to corrosion, cavitation and analogous deleterious influences. The method can be resorted to with particular advantage in connection with the treatment of those portions of metallic blanks which are to constitute the inlet edges or suction edges of vanes in the impeller of a centrifugal pump.

At the present time, the inlet edges and/or other edges of vanes for use in the impeller of a suction pump are reinforced or armored in the following way: A raw piece of casting is treated in the region of the edge or edges by removing some of its material so that the treated portion has a predetermined thickness. The thickness of the thus treated portion is thereupon increased by cladding to form two layers of armoring material. In the next step, the surplus of the armoring material is removed by one or more chip- or shaving-removing tools to thereby impart to the treated portion the final outline or shape. In the next step, the just discussed portion of the blank is subjected to a heat treatment.

The above outlined conventional procedure exhibits a number of serious drawbacks, especially if the treatment involves those portions of a blank which are hard to reach when the blank is converted into the vane or blade of an impeller or the like. Thus, the conventional procedure does not ensure that the thickness of the armor which is applied to the selected portion or portions of the blank is uniform throughout or that such thickness varies in accordance with a predetermined pattern, the armoring material is subject to lamination, it can develop so-called penetration notches as a result of the application of armoring material by cladding, and the outlet edge or discharge edge of the vane is likely to develop heat-induced cracks. Moreover, the reinforced edge is simply incapable of standing the corrosive or other destructive influences which develop in a centrifugal pump or a like flow machine. The aforementioned heat treatment entails a certain distortion of the blank; in the case of blanks which are to be converted into or which are to constitute the vanes or blades of impellers or the like, the distortion can be in the range of one, two or even three millimeters which is highly undesirable because it interferes with the assembly of the distorted part with other parts of the machine. Still further, and since the armoring operation involves the application of metallic material by welding, the armoring material is likely to penetrate between the blank for the vane and the customary copper plate which is interposed between the blank and the bath.

Since the outlet or discharge edge of a vane is not accessible, its finishing treatment normally involves so-called blind grinding. In fact, in most instances repair work at the side of the outlet edge is not possible at all and must be carried out at the inlet side.

OBJECTS AND SUMMARY OF THE INVENTION

An object of the invention is to provide a novel and improved method of reinforcing certain portions of metallic workpieces, particularly blanks which are to be converted into or which are to constitute blades or vanes in impellers, diffusers and analogous components of centrifugal pumps and like fluid machines.

Another object of the invention is to provide a simple and relatively inexpensive method of reinforcing the inlet and/or outlet edges of vanes for use in centrifugal pumps or the like.

A further object of the invention is to provide a novel and improved method of treating a blank or workpiece subsequent to the application of armoring material thereto.

An additional object of the invention is to provide a method which ensures much more reliable armoring of hard-to-reach portions of impeller blades or vanes than heretofore known methods so that the likelihood of damage to such hard-to-reach portions is greatly reduced and the machine or apparatus employing the armored blades or vanes can stand longer periods of use.

A further object of the invention is to provide a method which can be practiced with and upon a wide variety of blanks or workpieces.

Still another object of the invention is to provide a method which can be practiced by resorting to available machinery and which can dispense with the heat-treatment of armored workpieces.

An additional object of the invention is to provide a workpiece which is treated in accordance with the above outlined method.

A further object of the invention is to provide a centrifugal pump or another fluid machine employing one or more blades, vanes or analogous components which are treated in accordance with the above outlined method.

The invention resides in the provision of a method of reinforcing or armoring a metallic blank or workpiece having an exposed surface and a marginal portion along an edge of the exposed surface, particularly a blank which is to constitute or which is to be converted into the vane of the impeller or diffuser in a centrifugal pump or another fluid machine. The method comprises the steps of forming the exposed surface of the blank with a pair of neighboring recesses one of which is deeper than the other recess and is immediately adjacent to the edge of the exposed surface, filling the recesses with an armoring material which permanently adheres to the material of the blank, and removing at least a portion of the blank in the region of the one recess so that the exposed surface is provided with a fresh edge which is defined by the armoring material.

The filling step preferably comprises applying the armoring material with at least some surplus beyond that which is needed to fill the recesses, and the removing step then preferably includes removing the surplus of armoring material together with the removal of the aforementioned portion of the blank.

The filling step can comprise applying the armoring material by cladding.

The removing step preferably includes resort to a material removing (grinding, milling or other) tool.

The forming step can include making the blank, i.e., the contiguous recesses can be formed in the exposed surface simultaneously with casting or another mode of producing the blank. The blank may constitute a casting.

The novel features which are considered as characteristic of the invention are set forth in particular in the appended claims. The improved method itself, however, together with additional features and advantages thereof, will be best understood upon perusal of the following detailed description of certain specific embodiments with reference to the accompanying drawing.

BRIEF DESCRIPTION OF THE DRAWING

FIG. 1 is a sectional view of a blank which is used for the practice of conventional methods;

FIG. 2 is a sectional view of the blank of FIG. 1, showing the first step of a conventional method;

FIG. 3 is a sectional view similar to that of FIG. 2 but showing the next step of the conventional method;

FIG. 4 is a similar sectional view but showing the finished blank of FIGS. 1 to 3;

FIG. 5 is an enlarged fragmentary elevational view of the blank which is shown in FIG. 3, showing one possible cause of defects in the finished product;

FIG. 6 is a similar enlarged fragmentary elevational view of a finished blank which exhibits another type of defect;

FIG. 7 illustrates the structure of FIG. 5 or 6 but shows a third type of defect which is or can be encountered when the blanks are armored in accordance with conventional methods;

FIG. 8 shows the structure of FIG. 5, 6 or 7 and shows still another defect of blanks which are treated in accordance with heretofore known methods;

DESCRIPTION OF THE PREFERRED EMBODIMENTS

Figure 9:
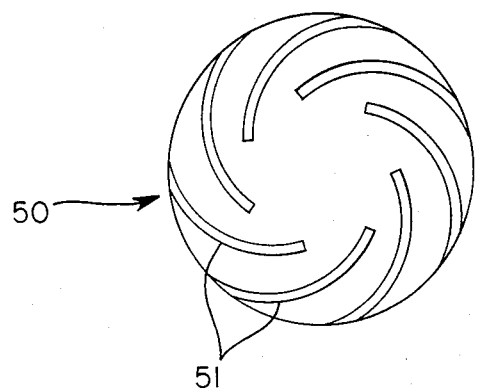
FIG. 9 is a front elevational view of an impeller with several vanes which can be treated in accordance with the method of the present invention.

FIG. 1 shows in section a portion of a blank B which is to be converted into the vane of an impeller in accordance with a heretofore known technique. The reference characters 1 and 2 respectively denote the suction and pressure sides or surfaces of the blank B when the latter is converted into an impeller. FIG. 2 illustrates that the material of the blank B is removed along the edge 1a of the suction side or surface 1 so that such surface is provided with a recess 3 which extends along the edge 1a. As shown in FIG. 3, the recess 3 is filled with a metallic armoring material by cladding. The application of such armoring material results in the development of two layers or strata, namely, an outer layer 4 which consists exclusively of armoring material and an inner layer 5 which is a mixture of the material of the blank B and of the armoring material. The resulting armored blank B' is then treated by one or more material removing tools and is converted into a finished blank B" which is shown in FIG. 4. Such finished blank is normally subjected to a heat treatment which entails at least some distortion of the product.

FIG. 5 illustrates one of the frequently occurring defects which develop in the blank B', normally in regions which are hard or plain impossible to detect in the assembled impeller. The character 7 denotes the finished vane, and the character 6 denotes armoring material which has penetrated between the external surface of the vane and a copper plate 8 which is a customary component of the cladding equipment and serves to shield the bath. FIG. 6 shows that the vane 7 can be formed with a penetration notch 9 (i.e., a different type of defect), and FIG. 7 shows a further defect in the form of a heat-induced crack 10. FIG. 8 shows at 11 the locus of unsatisfactory armoring of the vane 7 when the latter is produced in accordance with the aforediscussed conventional method.

FIG. 9 illustrates an impeller 50 (a so-called radial impeller with pure radial vanes) whose vanes 51 are treated in accordance with the method of the present invention.

Figure 10:
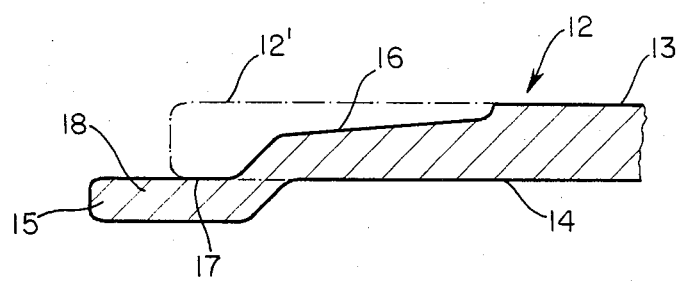
FIG. 10 is a fragmentary sectional view of a blank which is about to be converted into a vane of the type shown in FIG. 9.

Referring first to FIG. 10, there is shown a portion of a blank 12 which has an exposed suction side or surface 13, a pressure side or surface 14, and an edge 15 between the surfaces 13 and 14. The surface 13 is formed with two contiguous recesses 16 and 17. The deeper recess 17 is immediately adjacent to the edge 15, and the recesses 16, 17 can be formed during the making of the blank 12. Such blank is preferably a casting. The phantom line 12' denotes the outline of a conventional blank, such as the blank B of FIG. 1. It will be noted that a portion 18 of the blank 12 extends beyond the leftmost part of the outline 12'.

Figure 11:
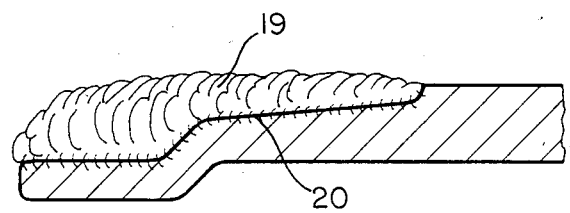
FIG. 11 is a similar sectional view showing the blank upon completion of the armoring step.
Figure 12:
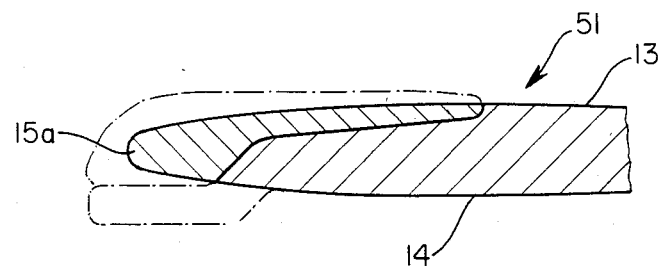
FIG. 12 is a similar sectional view showing the finished blank of FIGS. 10 and 11.

In the next step (note FIG. 11) the recesses 16 and 17 are overfilled with a metallic armoring material which again forms two layers, namely, an outer layer 19 of pure armoring material and an inner layer 20 which is a mixture of armoring material and the material of the blank 12. The armoring material permanently adheres to the blank 12 along the surfaces bounding the recesses 16 and 17. The final step is shown in FIG. 12; this step involves removal of the surplus of armoring material as well as of the portion 18 of the blank 12 so that the latter is converted into a vane or blade 51 having a fresh edge 15a defined exclusively by the armoring material. The pressure side or surface 14 extends all the way to the freshly formed edge 15a and does not exhibit a step in the region of the edge 15a. This is due to removal of the portion 18 by the material removing tool or tools.

The shallower recess 16 of FIG. 10 can be compared with the recess 3 shown in FIG. 2. The making of the deeper recess 17 serves the purpose of protecting the welding pool or puddle. The portion 18 of the blank 12 actually replaces the copper plate 8 of FIG. 5. FIG. 12 shows clearly that the removal of material from the blank 12 (i.e., the conversion of this blank into a vane 51) involves removal of the material of the blank as well as removal of armoring material, not only at the extension of the suction side or surface 13 but also from that portion of armoring material which fills the deeper recess 17. Furthermore, conversion of the blank 12 into a vane 51 also involves removal of the portion 18 with attendant removal of the original edge 15. Those portions of the layers 19, 20 and of the blank 12 which are removed by machining are indicated by phantom lines.

A comparison of the vane 51 of FIG. 12 with the vane 7 of FIGS. 5 to 8 will reveal that the vane 51 is armored in the region of the entire edge 15a. On the other hand, armoring of the vane 7 does not involve the provision of an edge composed exclusively of the armoring material (such armoring material is indicated in FIGS. 5 to 8 by hatching).

Another important advantage of the vane 51 of FIG. 12 is that the thickness of the remaining material of the blank 12 in the region of the fresh edge 15a and the thickness of the armoring material which fills the recess 16 and the remaining portion of the deeper recess 17 can be selected and achieved with a very high degree of accuracy and reproducibility. Therefore, the likelihood that the vane 51 would undergo corrosion as a result of cavitation in the region of the edge 15a is much more remote than when one employs vanes of the type shown in FIGS. 5 to 8. Cavitation is especially likely to develop at the pressure side 14 of the vane 51. Still further, the vane 51 is not likely to develop defects of the type shown in FIGS. 5, 6, 7 and 8. Moreover, the armoring material 19, 20 is less likely to be distorted because it is relatively thick, particularly in the region of the edge 15a.

The improved method can be resorted to for reinforcement of blanks or workpieces along one or more full edges or along portions of such edges.

Still another important advantage of the improved method is that it ensures reliable reinforcement of those portions of vanes or the like which are not readily accessible so that the machines which embody such vanes need not be inspected at frequent intervals and the portions of vanes which are subject to cavitation and/or other deleterious influences can stand long periods of use.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method for reinforcing a metallic blank having a first side, a second side and an edge therebetween, particularly a blank which is to constitute or is to be converted into a vane of a centrifugal pump or like fluid machine wherein one side is to be a suction side and the other side a pressure side, said method comprising the steps of
   (a) forming one of said sides of the blank with a pair of neighboring recesses, one of which is deeper than the other and immediately adjacent the edge of the blank;
   (b) filling both recesses with an armoring material, said filling step including fusing the armoring material to the material of the blank; and,
   (c) removing at least a substantial portion of the blank defining the deeper recess, as well as removing some of the armoring material, so that the blank is provided with a fresh edge which is defined solely by the armoring material.

2. The method of claim 1, wherein the filling step comprises applying the armoring material with at least some surplus beyond that which is needed to fill the recesses, said removing step including removing the surplus together with said portion of the blank.

3. The method of claim 2, wherein said filling step comprises applying the armoring material by cladding.

4. The method of claim 2, wherein said removing step includes resort to a material removing tool.

5. The method of claim 2, wherein said forming step includes making the blank.

6. The method of claim 2, wherein the blank is a casting.

* * * * *